(12) United States Patent
Gibilterra et al.

(10) Patent No.: US 11,741,505 B2
(45) Date of Patent: Aug. 29, 2023

(54) SYSTEM AND METHOD FOR PREDICTING AN ANTICIPATED TRANSACTION

(71) Applicant: Capital One Services, LLC, McLean, VA (US)

(72) Inventors: Kaylyn S. Gibilterra, New York, NY (US); Steven Quadros, New York, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/879,107

(22) Filed: May 20, 2020

(65) Prior Publication Data

US 2021/0365994 A1    Nov. 25, 2021

(51) Int. Cl.
*G06Q 30/02*       (2023.01)
*G06N 20/00*       (2019.01)
*G06Q 30/0251*     (2023.01)
*G06Q 30/0241*     (2023.01)
*G06F 18/214*      (2023.01)

(52) U.S. Cl.
CPC ....... *G06Q 30/0271* (2013.01); *G06F 18/214* (2023.01); *G06N 20/00* (2019.01); *G06Q 30/0255* (2013.01); *G06Q 30/0277* (2013.01)

(58) Field of Classification Search
CPC .. G06Q 30/0202; G06Q 20/227; G06Q 50/01; G06Q 30/0206; G06N 20/00
See application file for complete search history.

(56) References Cited

U.S. PATENT DOCUMENTS

| | | | | |
|---|---|---|---|---|
| 10,140,623 B1* | 11/2018 | Lloyd | ................ | G06Q 30/0205 |
| 10,552,863 B1* | 2/2020 | Sadagopan | .............. | G06N 7/01 |
| 2005/0080692 A1* | 4/2005 | Padam | .................. | G06Q 40/12 |
| | | | | 705/30 |
| 2014/0229233 A1* | 8/2014 | Hu | ...................... | G06Q 30/0202 |
| | | | | 705/7.31 |
| 2015/0220983 A1* | 8/2015 | Chauhan | ................ | G06Q 50/01 |
| | | | | 705/14.53 |
| 2015/0332284 A1* | 11/2015 | Unser | ................ | G06Q 30/0201 |
| | | | | 705/7.29 |
| 2016/0148224 A1* | 5/2016 | Misra | ................. | G06Q 30/0202 |
| | | | | 705/7.31 |

(Continued)

*Primary Examiner* — Saba Dagnew
(74) *Attorney, Agent, or Firm* — DLA Piper LLP (US)

(57) ABSTRACT

A system and method of generating directed advertisements is disclosed herein. A computing system identifies a baseline history of customer spending for one or more merchant category codes. The computing system generates a time series algorithm for each merchant category code of the one or more merchant category codes. The time series algorithm is based on the baseline history. The computing system receives a stream of transactions associated with a user. The computing system inputs the stream of user data into the time series algorithm. The computing system receives, as output, an anticipated purchase window for the user with respect to each merchant category code of the one or more merchant category codes. The anticipated purchase window includes an anticipated date of next purchase and anticipated purchase amount. The computing system directs advertisements to the user in accordance with each respective anticipated purchase window.

10 Claims, 6 Drawing Sheets

(56) References Cited

U.S. PATENT DOCUMENTS

| | | | |
|---|---|---|---|
| 2016/0171540 A1* | 6/2016 | Mangipudi | G06Q 30/0255 |
| | | | 705/14.53 |
| 2017/0061555 A1* | 3/2017 | Maheshwari | G06Q 30/0206 |
| 2017/0300957 A1* | 10/2017 | Yoder | G06Q 30/06 |
| 2018/0349790 A1* | 12/2018 | Cai | G06N 20/00 |
| 2019/0164181 A1* | 5/2019 | Adjaoute | G06Q 20/4016 |

\* cited by examiner

SYSTEM AND METHOD FOR PREDICTING AN ANTICIPATED TRANSACTION

FIELD OF THE DISCLOSURE

The present disclosure generally relates to a system and method for generating directed advertisements.

BACKGROUND

Businesses use marketing campaigns to communicate the value of a brand or product to the consumers. Marketing can be advertising in the form of brand awareness, sale of products or services, or deals and incentives. Advertising can take many forms including billboards, direct mail, radio cinema, television commercials, newspaper ads, magazines, telemarketing, etc. With the emergence of the World Wide Web and advances in hand-held device technology, among other things, new advertising mediums are available to businesses. For example, advertisements can now take the form of web banners, rich media ads, social network advertising, online classified advertising, e-mail marketing, and other forms of multimedia marketing advertisements.

SUMMARY

Embodiments disclosed herein are generally directed to a system and method of generating directed advertisements. In one embodiment, a method of generating directed advertisements is disclosed herein. A computing system identifies a baseline history of customer spending for one or more merchant category codes. The computing system generates a time series algorithm for each merchant category code of the one or more merchant category codes. The time series algorithm is based on the baseline history. The computing system receives a stream of transactions associated with a user. The computing system inputs the stream of user data into the time series algorithm. The computing system receives, as output, an anticipated purchase window for the user with respect to each merchant category code of the one or more merchant category codes. The anticipated purchase window includes an anticipated date of next purchase and anticipated purchase amount. The computing system directs advertisements to the user in accordance with each respective anticipated purchase window.

In some embodiments, the computing system identifying the baseline history of customer spending for the one or more merchant category codes includes identifying the baseline history on a merchant-level.

In some embodiments, the stream of transactions associated with the user includes at least one of merchant name, merchant category code, seasonality information, and amount spent.

In some embodiments, the computing system directing the advertisements to the user in accordance with the one or more metrics includes generating a personalized webpage that includes the advertisements.

In some embodiments, directing the advertisements to the user in accordance with the one or more metrics includes generating an electronic message comprising the advertisements and transmitting the electronic message to the user.

In some embodiments, the computing system receiving, as the output, the one or more metrics associated with the spending habits of the user with respect to each merchant category code of the one or more merchant category codes includes an estimated time the user will next transact with a merchant having a specified merchant category code.

In some embodiments, the computing system generating the time series algorithm for each merchant category code of the one or more merchant category codes includes generating the time series algorithm that includes a first variable corresponding to a trend of the customer spending, a second variable corresponding to a seasonality of the customer spending, and a third value corresponding to a noise associated with the customer spending.

In another embodiments, a method of generating directed advertisements is disclosed herein. A computing system identifies a stream of transactions for a plurality of users. The computing system learns one or more spending habits of the plurality of users via a machine learning algorithm. The computing system generates a prediction model based on the learning, the prediction model configured to forecast future spending of each user of the plurality of users. The computing system receives a stream of transactions associated with a user of the plurality of users. The computing system inputs the stream of transactions into the prediction model. The computing system identifies an anticipated window in which the user will transact at a merchant having a specified merchant category code. The anticipated purchase window comprises an anticipated date of next purchase and anticipated purchase amount. The computing system directs advertisements to the user in accordance with each respective anticipated purchase window.

In some embodiments, the computing system directing the one or more advertisements to the user during the anticipated window includes generating a personalized webpage comprising the one or more advertisements.

In some embodiments, the computing system directing the one or more advertisements to the user during the anticipated window includes generating an electronic message comprising the one or more advertisements and transmitting the electronic message to the user.

In some embodiments, the computing system further generates a personalized webpage for a merchant of a plurality of merchants. The personalized webpage includes statistics corresponding to a success rate of advertisements associated with the merchant.

In some embodiments, the computing system identifying an anticipated window in which the user will transact at a merchant having a specified merchant category code includes defining the anticipated window on a merchant-level basis.

In some embodiments, the one or more advertisements are tailored to the user.

In another embodiments, a system is disclosed herein. The system includes a processor and a memory. The memory has programming instructions stored thereon, which, when executed by the processor, perform one or more operations. The one or more operations include generating a time series algorithm for each merchant category code of one or more merchant category codes. The time series algorithm is based on a baseline history of customer spending for each merchant code. The one or more operations further include receiving a stream of transactions associated with a user. The one or more operations further include inputting the stream of user data into the time series algorithm. The one or more operations further include receiving, as output, an anticipated purchase window for the user with respect to each merchant category code of the one or more merchant category codes. The anticipated purchase window includes an anticipated date of next purchase and anticipated purchase amount. The one or more operations further include directing advertisements to the user in accordance with each respective anticipated purchase window.

In some embodiments, identifying the baseline history is on a merchant-level.

In some embodiments, the stream of transactions associated with the user includes at least one of merchant name, merchant category code, seasonality information, and amount spent.

In some embodiments, directing the advertisements to the user in accordance with the one or more metrics includes generating a personalized webpage comprising the advertisements.

In some embodiments, directing the advertisements to the user in accordance with the one or more metrics includes generating an electronic message comprising the advertisements and transmitting the electronic message to the user.

In some embodiments, the output includes an estimated time the user will next transact with a merchant having a specified merchant category code.

In some embodiments, generating the time series algorithm for each merchant category code of the one or more merchant category codes includes generating the time series algorithm that includes a first variable corresponding to a trend of the customer spending, a second variable corresponding to a seasonality of the customer spending, and a third value corresponding to a noise associated with the customer spending.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques disclosed herein generally relate to a system and method of generating a directed advertisement. In conventional online advertisement systems, advertisers typically flood a customer with electronic mail or physical mail related to various deals, offers, sales, etc. related to the advertiser's business. Such systems conventionally fail on multiple levels. First, merchants typically advertise to users year round, even when those users might have recently transacted with a given merchant. Such advertisements typically result in wasted resources. Further, because merchants advertise to consumers year-round, consumers may frequently become frustrated with a given merchant and may unsubscribe from advertisements.

The system disclosed herein attempts to improve upon conventional advertisement systems by predicting an anticipated purchase window of given users. For example, based on the user's purchase history, the techniques disclosed herein may be able to generate an anticipated purchase window on both a third party merchant level and a merchant category code level. Once an anticipated purchase window is generated, the present system may notify third party merchants as to when to direct certain advertisements to certain users. In other words, the one or more techniques disclosed herein learns customer/user spending habits, and uses that learning to advise merchants when the user is likely to next transact with that particular third party merchant or a category of third party merchants.

The term "user" as used herein includes, for example, a person or entity that owns a computing device or wireless device; a person or entity that operates or utilizes a computing device; or a person or entity that is otherwise associated with a computing device or wireless device. It is contemplated that the term "user" is not intended to be limiting and may include various examples beyond those described.

Figure 1:
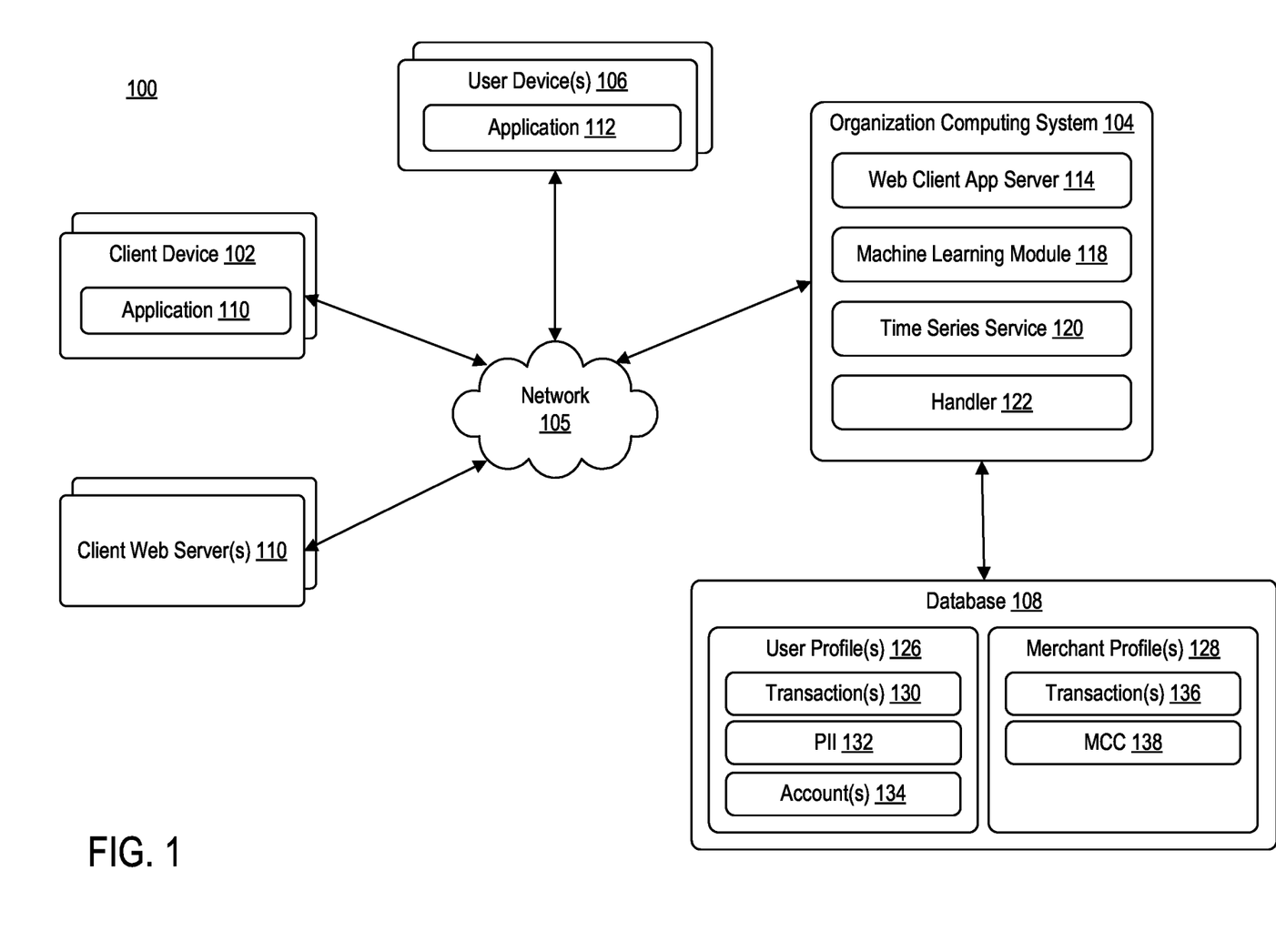
FIG. 1 is a block diagram illustrating a computing environment, according to example embodiments.

FIG. 1 is a block diagram illustrating a computing environment 100, according to one embodiment. Computing environment 100 may include at least a client device 102, an organization computing system 104, user devices 106, and a database 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 124. Application 124 may be representative of a web browser that allows access to a website or a standalone application. Client device 102 may access application to access functionality associated with organization computing system 104. For example, client device 102 may access organization computing system 104 to determine when to advertise to certain users. In another example, client device 102 may access organization computing system 104 to determine the conversion rate of a particular advertisement (e.g., whether a user clicked on the advertisement, whether the user submitted a promo code in an advertisement, whether the user purchased the item displayed in the advertisement, and the like. Client device 102 may communicate over network 105 to request a webpage, for example, from web client application server 114 associated with organization computing system 104. The content that is displayed to client device 102, and subsequently processed by application 124, may be transmitted from web client application server 114 to client device 102, and subsequently processed by application 124 for display through a graphical user interface (GUI) of client device 102.

Client web server 110 may be associated with client device 102. For example, both client web server 110 and client device 102 may be associated with a third party merchant. Client web server 110 may be configured to host one or more websites associated with the third party merchant. Each website may support electronic transactions between a user device 106 and third party merchant.

User device 106 may be operated by a user. For example, client device 102 may be a mobile device, a tablet, a desktop computer, or any computing system having the capabilities described herein. User device 106 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with client device 102 and/or client web server 110.

User device 106 may include at least application 112. Application 112 may be representative of a web browser that allows access to a website or a stand-alone application. User device 106 may access application 112 to access one or more websites hosted by a client web server 110. User device 106 may communicate over network 105 to request a webpage, for example, from client web server 110 hosting a website associated with a third party merchant. The content that is displayed to user device 106 may be transmitted from client web server 110 to client device 102, and subsequently processed by application 112 for display through a graphical user interface (GUI) of user device 106.

Organization computing system 104 may include at least web client application server 114, machine learning module 118, time series service 120, and handler 122. Each of machine learning module 118, time series service 120, and handler may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Generally, when a user attempts to transact with a third party merchant, third party merchant (whether client device 102 or client web server 110) may transmit a transaction request to organization computing system 104. Handler 122 may be configured to manage the transaction request. For example, handler 122 may be configured to parse one or more parameters contained in the transaction request to determine if the transaction request is authentic. Handler 122 may then store the transaction in database 108. The one or more parameters contained in each transaction request may include at least one of: an account number, a name of the user, an amount to be transacted, a merchant category code, a date of the transaction, a name of the third party merchant, a location of the third party merchant, and the like.

Organization computing system 104 may be accessed by client device 102 for advertisement analysis and recommendation. For example, by analyzing user transactions, organization computing system 104 may predict an anticipated purchase window for the user. The anticipated purchase window may represent an anticipated date of the user making a particular purchase. For example, for each merchant category code, organization computing system 104 may predict an anticipated window in which the user is expected to make a purchase having that particular merchant category code. In another example, for each third party merchant, organization computing system 104 may predict an anticipated window in which the user is expected to transact with that particular third party merchant.

Machine learning module 118 may be configured to generate an anticipated window that predicts when a user will transact for a given merchant category code, third party merchant, and the like. For example, machine learning module 118 may be configured to learn how to generate the anticipated window for a user transaction. In some embodiments, machine learning module 118 may learn how to generate an anticipated window for when the user will transact at a third party merchant associated with a particular merchant category code. In some embodiments, machine learning module 118 may learn how to generate an anticipated window for when the user will transact with a particular third party merchant.

To train a prediction model for generating the anticipated window, machine learning module 118 may receive historical transaction data for a given user. Such historical transaction data may include, but is not limited to, a transaction amount for a given transaction, an entity associated with the transaction (e.g., third party merchant), a merchant category code associated with the transaction, a date of the transaction, and the like. Machine learning module 118 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model.

In some embodiments, rather than utilizing machine learning processes to generate the anticipated window, organization computing system 104 may utilize time series service 120. Time series service 120 may be configured to develop time series algorithms that track user spending. For example, time series service 120 may be configured to develop time series algorithms for the more popular merchant category codes and merchants, for which organization computing system 104 would track to improve (e.g., optimize) sales and spending. Time series service 120 may track when a particular customer (e.g., user) spends their money at their most common merchants and merchant category codes and input that information into a time series algorithm. In some embodiments, time series service 120 may take into consideration seasonality impact of spending. The time series algorithm generated by time series service 120 may include one or more variables. For example, time series algorithm may include a first variable corresponding to a trend of customer spending, a second variable corresponding to a seasonality of customer spending, and a third variable corresponding to a noise associated with customer spending. The output from the time series algorithm may be an anticipated purchase window with respect to, for example, a particular merchant or merchant category code. The anticipated purchase window may correspond to an anticipated date of next purchase. In some embodiments, the anticipated purchase window may further correspond to an anticipated purchase amount.

In some embodiments, based on the determination by machine learning module 118 and/or time series service 120, organization computing system 104 may notify a particular third party merchant when to direct certain advertisements to a user. For example, assuming that machine learning module 118 predicts that a user's anticipated purchase window is between March 1 and March 20 for sports nutrition products, organization computing system 104 may notify sports nutrition merchants that March 1 and March 20 is the anticipated purchase window for this merchant category code.

In some embodiments, organization computing system 104 may generate a personalized web page for each user. For example, for each user, organization computing system 104 may generate a web page that includes personalized advertisements directed to the user based on the user's purchasing habits. An exemplary personalized web page is illustrated below in conjunction with FIG. 4.

In some embodiments, organization computing system 104 may generate a personalized web page for each third party merchant. For example, for each third party merchant, organization computing system 104 may track the conversion rate of one or more advertisements associated therewith. An exemplary personalized web page is illustrated below in conjunction with FIG. 5.

Handler 122 may be configured to maintain database 108. Database 108 may be in communication with organization computing system 104. Database 108 may include one or more user profiles 126 and one or more merchant profiles 128.

Each user profile 126 may be representative of a user associated with organization computing system 104. For example, each user profile 126 may correspond to a user that has an account with an organization or entity associated with organization computing system 104. Each user profile 126 may include one or more transactions 130, personal identification information (PII) 132, and one or more accounts 134. Each transaction 130 may correspond to a transaction that occurred on a particular user's account. Each transaction 130 may include one or more parameters associated therewith. Exemplary parameters may include, but are not limited to, date of transaction, merchant category code, third party merchant associated with the transaction, amount of the transaction, location of the transaction, and the like.

Personal identification information 132 may include, but is not limited to, name, mailing address, billing address, phone number, credit score, income, social security number, and the like.

Each account 134 may correspond to a user's account with an organization or entity associated with organization computing system 104. Exemplary accounts 134 may include, but are not limited to, checking accounts, credit accounts, savings accounts, loan accounts, and the like.

Each merchant profile 128 may be representative of a third party merchant that has requested organization computing system's 104 services. Each merchant profile 128 may include transactions 136 and merchant category codes. Transactions 136 may be representative of user transactions at the respective merchant. Each transaction 136 may include one or more parameters associated therewith. Exemplary parameters may include, but are not limited to, date of transaction, merchant category code, user information associated with the transaction, amount of the transaction, location of the transaction, and the like. Each merchant category code 138 may correspond to one or more merchant category codes assigned to a particular merchant.

Figure 2:
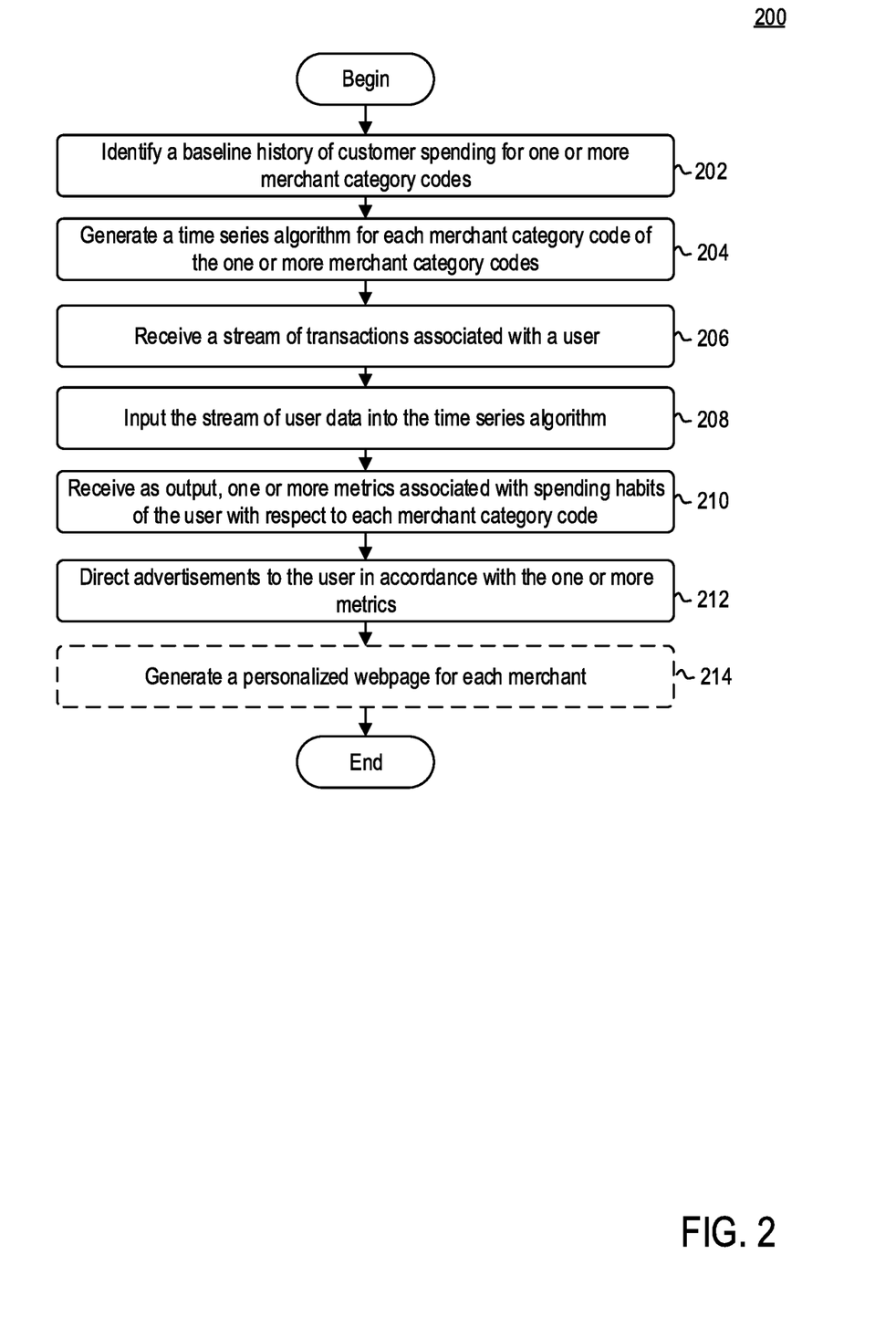
FIG. 2 is a flow diagram illustrating a method of generating a directed advertisement, according to example embodiments.

FIG. 2 is a flow diagram illustrating a method 200 of generating directed advertisements, according to example embodiments. Method 200 may begin at step 202.

At step 202, organization computing system 104 may identify a baseline history of customer spending for one or more merchant category codes. For example, handler 122 may parse transactions 130 for a user profile 126 to determine which merchant category codes have at least a threshold number of transactions. Those merchant category codes that have at least the threshold number of transactions have a baseline history of customer spending for prediction.

At step 204, organization computing system 104 may generate a time series algorithm for each merchant category code of the one or more merchant category codes. For example, time series service 120 may develop a time series algorithm that track user spending for each merchant category code. Each time series algorithm generated by time series service 120 may include one or more variables. For example, each time series algorithm may include a first variable corresponding to a trend of customer spending, a second variable corresponding to a seasonality of customer spending, and a third variable corresponding to a noise associated with customer spending.

At step 206, organization computing system 104 may receive a stream of user transactions. In some embodiments, organization computing system 104 may receive the stream of user transactions from one or more third party merchants. Each user transaction may include one or more parameters associated therewith. Exemplary parameters may include, but are not limited to, date of transaction, merchant category code, third party merchant associated with the transaction, amount of the transaction, location of the transaction, and the like.

At step 208, organization computing system 104 may input the stream of user data into the time series algorithm. For example, handler 122 may identify a subset of user data associated with a particular merchant category code. Handler 122 may input that subset of user data in a time series algorithm associated with the respective merchant category codes. In another example, handler 122 may identify a subset of user data associated with a particular third party merchant.

At step 210, organization computing system 104 may receive, as output, from each time series algorithm, one or more metrics associated with spending habits of the user. In some embodiments, the output may be representative of a user's anticipated purchase window with respect to a particular merchant category code. In some embodiments, the output may be representative of a user's anticipated purchase window with respect to a particular third party merchant. In some embodiments, the output may include an anticipated date of purchase for the user's next transaction with a third party merchant and/or a particular merchant category code. In some embodiments, the output may include the anticipated purchase amount for the anticipated user purchase.

At step 212, organization computing system 104 may direct advertisements to the user in accordance with the one or more metrics. For example, organization computing system 104 may notify a third party merchant that they should be targeting certain users with advertisements during the anticipated purchase window. In another example, organization computing system 104 may notify all third party merchants associated with a merchant category code that they should be targeting certain users with advertisements during the anticipated purchase window. In some embodiments, organization computing system 104 may notify each client device 102 via application 124 executing thereon. In some embodiments, organization computing system 104 may generate a webpage that includes one or more directed advertisements from one or more third party merchants. The one or more directed advertisements may be based on the user's anticipated purchase window.

In some embodiments, method 200 may further include step 214. At step 214, organization computing system 104 may generate a personalized webpage for each third party merchant. For example, organization computing system 104 may track user interaction with the one or more directed advertisements. For example, organization computing system 104 may determine a conversion rate of each directed advertisement. Organization computing system 104 may present each third party merchant with the conversion rates for each advertisement.

Figure 3:
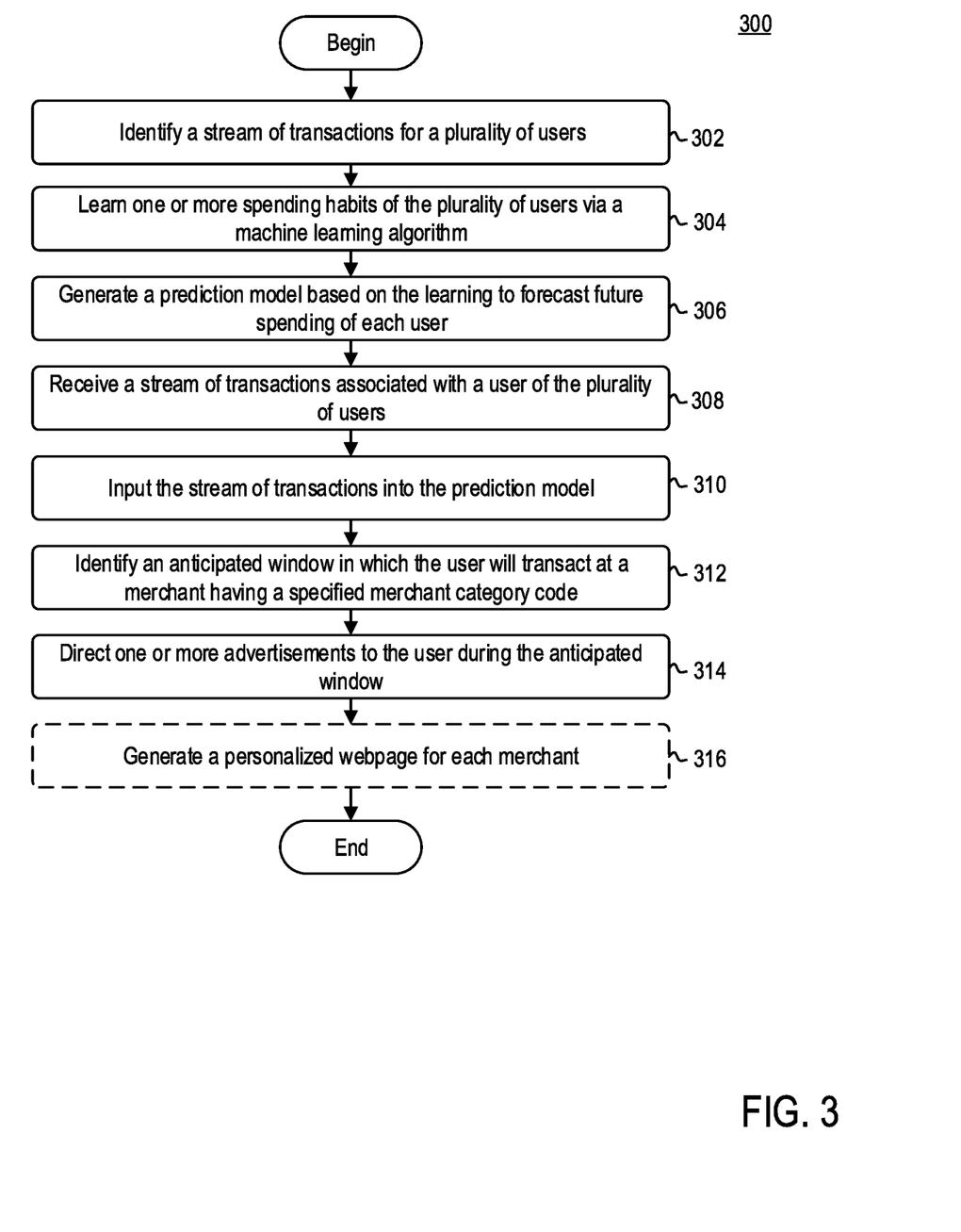
FIG. 3 is a flow diagram illustrating a method of generating a directed advertisement, according to example embodiments.

FIG. 3 is a flow diagram illustrating a method 300 of generating directed advertisements. Method 300 may begin at step 302.

At step 302, organization computing system 104 may identify a plurality of transactions associated with a plurality of users. Organization computing system 104 may generate a plurality of training data sets based on the plurality of transactions. For example, handler 122 may identity plurality of transactions associated with a given user with respect to a merchant category code, and generated a training data set based on the identified plurality of transactions. In another example, handler 122 may identify a plurality of transactions associated with respect to a particular third party merchant.

At step 304, organization computing system 104 may learn one or more spending habits of the plurality of users via machine learning module 118. For example, organization computing system 104 may learn the habit of each user with respect to a third party merchant. In other words, given historical transactions of a user at a particular third party merchant, organization computing system 104 may train a prediction model that can generate an anticipated purchase date for a future transaction with the particular third party merchant. In another example, organization computing system 104 may learn the habit of each user with respect to a merchant category code. In other words, given historical transactions of a user from third party merchants with a given merchant category code, machine learning module 118 may train a prediction model that can generate an anticipated purchase date for a future transaction with a third party merchant corresponding to a particular merchant category code.

At step 306, organization computing system 104 may generate a prediction model based on the learning that forecasts future spending of the user. In some embodiments, as a result of the training process, organization computing system 104 may generate a prediction model that can predict when a user will transact at a given third party merchant. In some embodiments, as a result of the training process, organization computing system 104 may generate a prediction model that can predict when a user will transact at a given third party merchant associated with a merchant category code.

At step 308, organization computing system 104 may receive a stream of transactions associated with a user of a plurality of users. In some embodiments, the stream of transactions may include real-time (or near real-time) transactions. In some embodiments, the stream of transactions may include historical transactions associated with database 108. Each transaction may include one or more parameters associated therewith. Exemplary parameters may include, but are not limited to, date of transaction, merchant category code, third party merchant associated with the transaction, amount of the transaction, location of the transaction, and the like.

At step 310, organization computing system 104 may input the stream of transactions into a trained prediction model. For example, handler 122 may identify a subset of user transactions associated with a particular merchant category code. Handler 122 may input that subset of user data in a trained prediction model associated with the respective merchant category codes. In another example, handler 122 may identify a subset of user transactions associated with a particular third party merchant. Handler 122 may input that subset of user transactions in a trained prediction model associated with that particular third party merchant.

At step 312, organization computing system 104 may receive, as output, from one or more trained prediction models, one or more metrics associated with spending habits of the user. In some embodiments, the output may be representative of a user's anticipated purchase window with respect to a particular merchant category code. In some embodiments, the output may be representative of a user's anticipated purchase window with respect to a particular third party merchant. In some embodiments, the output may include an anticipated date of purchase for the user's next transaction with a third party merchant and/or a particular merchant category code. In some embodiments, the output may include the anticipated purchase amount for the anticipated user purchase.

At step 314, organization computing system 104 may direct advertisements to the user in accordance with the one or more metrics. For example, organization computing system 104 may notify a third party merchant that they should be targeting certain users with advertisements during the anticipated purchase window. In another example, organization computing system 104 may notify all third party merchants associated with a merchant category code that they should be targeting certain users with advertisements during the anticipated purchase window. In some embodiments, organization computing system 104 may notify each client device 102 via application 124 executing thereon. In some embodiments, organization computing system 104 may generate a webpage that includes one or more directed advertisements from one or more third party merchants. The one or more directed advertisements may be based on the user's anticipated purchase window.

In some embodiments, method 300 may further include step 316. At step 316, organization computing system 104 may generate a personalized webpage for each third party merchant. For example, organization computing system 104 may track user interaction with the one or more directed advertisements. For example, organization computing system 104 may determine a conversion rate of each directed advertisement. Organization computing system 104 may present each third party merchant with the conversion rates for each advertisement.

Figure 4:
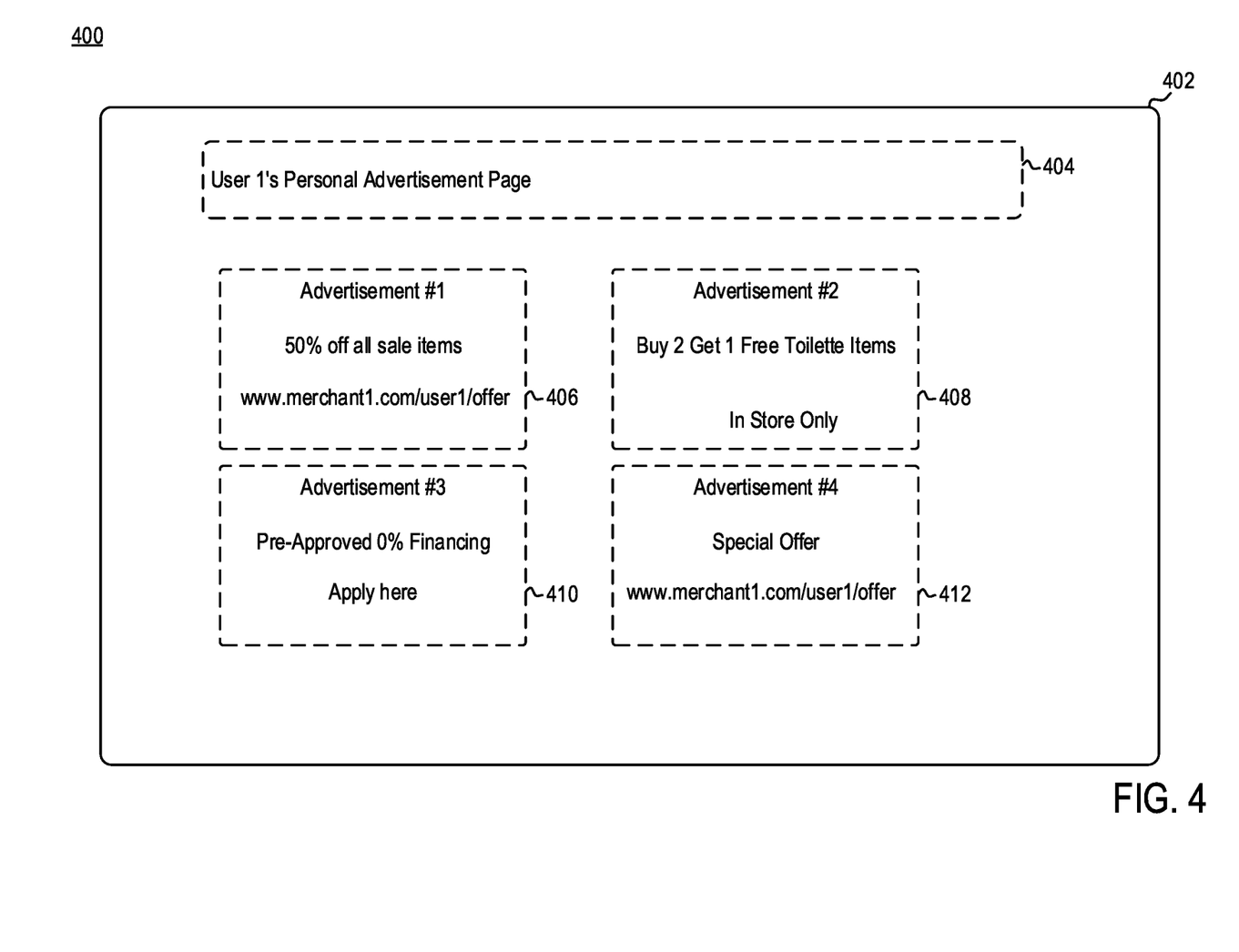
FIG. 4 is a block diagram illustrating a graphical user interface, according to example embodiments.

FIG. 4 is a block diagram 400 illustrating an exemplary GUI 402, according to example embodiments. GUI 402 may be representative of a customized advertisement page for a respective user. For example, each advertisement displayed to the user may be an advertisement corresponding the user's current anticipated purchase window. As illustrated, GUI 402 may include one or more graphical elements 404-412.

Graphical element 404 may correspond to a banner or header of GUI 402. As illustrated, graphical element 404 states: User 1's Personal advertisement page. Graphical elements 406-412 may represent a given advertisement. Each advertisement may correspond to a third party merchant or merchant category code, for which organization computing system 104 has determined to have fallen in a present anticipated purchase window. In other words, each advertisement may be relevant to an anticipated purchase by the user.

Figure 5:
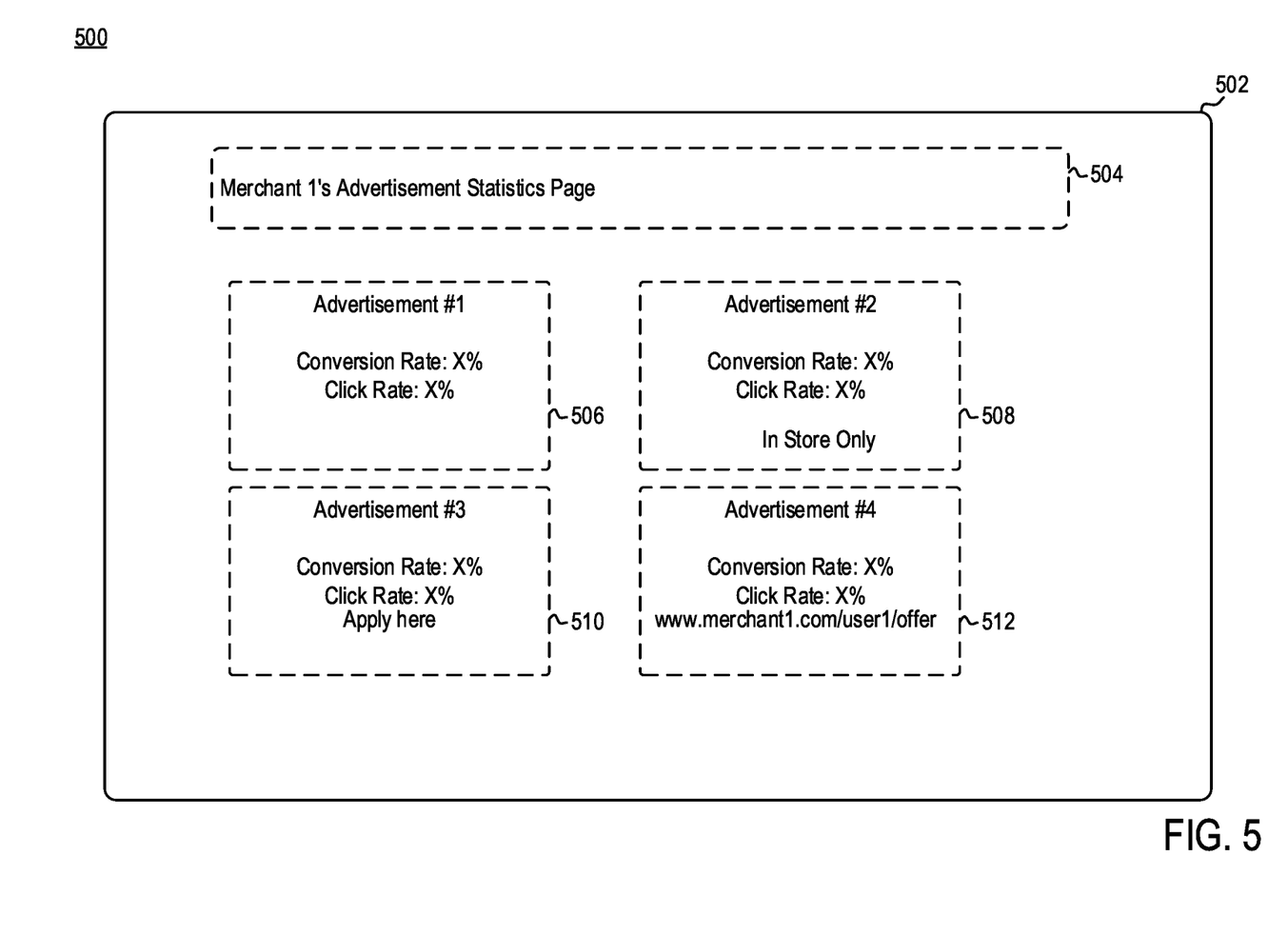
FIG. 5 is a block diagram illustrating a graphical user interface, according to example embodiments.

FIG. 5 is a block diagram 500 illustrating an exemplary GUI 502, according to example embodiments. GUI 502 may be representative of a customized advertisement page for a respective third party merchant. For example, each advertisement displayed via GUI 502, may be representative of a current or expired offer from the third party merchant. As illustrated, GUI 502 may include one or more graphical elements 504-512.

Graphical element 504 may correspond to a banner or header of GUI 502. As illustrated, graphical element 504 states: Merchant 1's Advertisement Statistics Page. Graphical elements 506-512 may represent a given advertisement. For each advertisement, GUI 502 may include the conversion rate and click rate. Conversion rate may correspond to the number of times a user purchased a product after clicking the advertisement, using a promotion code displayed in the advertisement, or the like. Click rate may correspond to the number of times a user clicked a particular advertisement. By displaying metrics associated with each advertisement, third party merchants can easily view the advertisements that worked and the advertisements that did not work.

Figure 6:
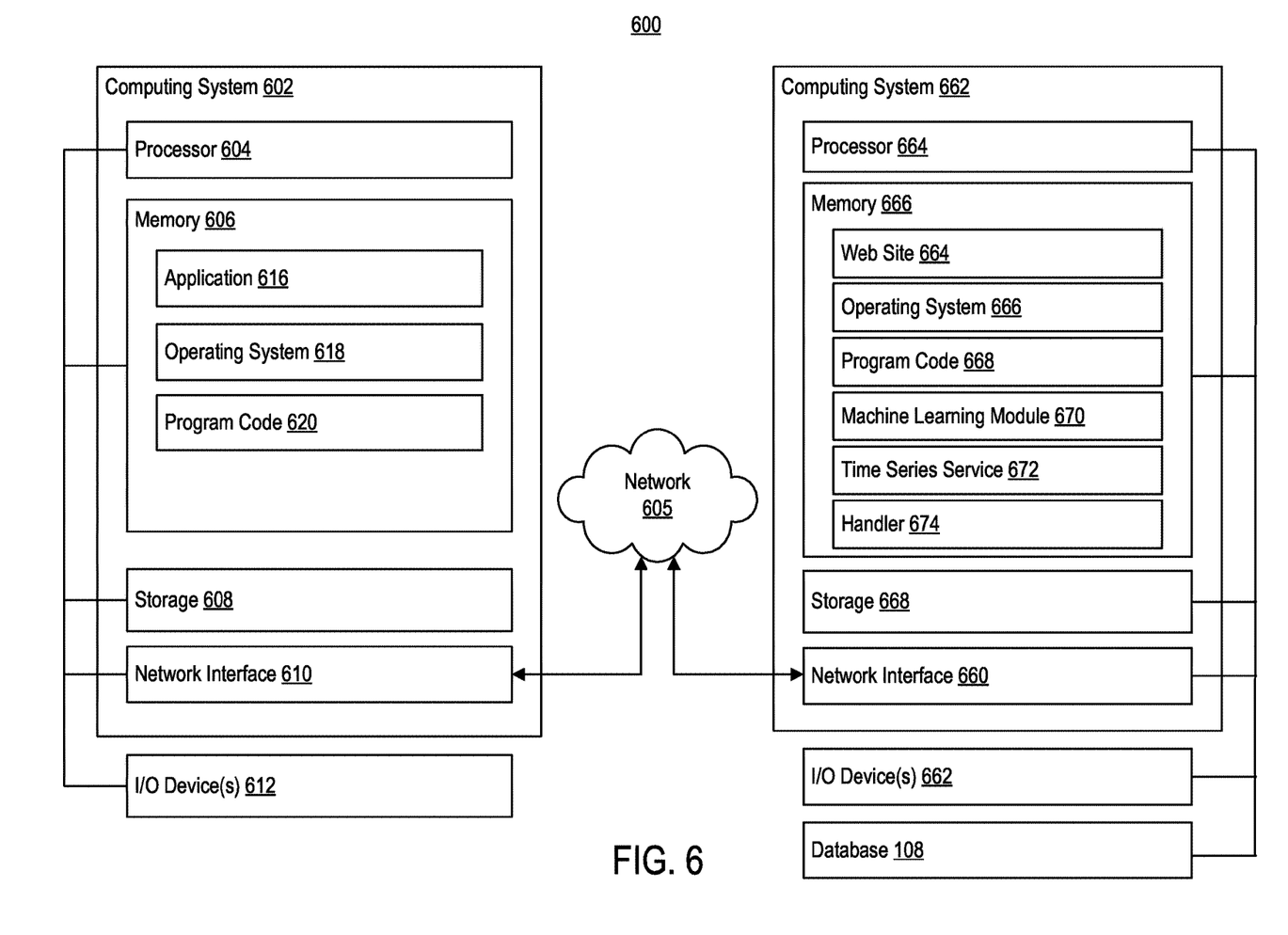
FIG. 6 is a block diagram illustrating a computing environment, according to example embodiments.

FIG. 6 is a block diagram illustrating an exemplary computing environment 600, according to some embodiments. Computing environment 600 includes computing system 602 and computing system 652. Computing system 602 may be representative of client device 102. Computing system 652 may be representative of organization computing system 104.

Computing system 602 may include a processor 604, a memory 606, a storage 608, and a network interface 610. In some embodiments, computing system 602 may be coupled to one or more I/O device(s) 612 (e.g., keyboard, mouse, etc.).

Processor 604 may retrieve and execute program code 620 (i.e., programming instructions) stored in memory 606, as well as stores and retrieves application data. Processor 604 may be included to be representative of a single processor, multiple processors, a single processor having multiple processing cores, and the like. Network interface 610 may be any type of network communications allowing computing system 602 to communicate externally via computing network 605. For example, network interface 610 is configured to enable external communication with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 616, operating system 618, and program code 620. Program code 620 may be accessed by processor 604 for processing (i.e., executing program instructions). Program code 620 may include, for example, executable instructions for communicating with computing system 652 to display one or more pages of website 664. Application 616 may enable a user of computing system 602 to access a functionality of computing system 652. For example, application 616 may access content managed by computing system 652, such as website 664. The content that is displayed to a user of computing system 602 may be transmitted from computing system 652 to computing system 602, and subsequently processed by application 616 for display through a graphical user interface (GUI) of computing system 602.

Computing system 652 may include a processor 654, a memory 656, a storage 658, and a network interface 660. In some embodiments, computing system 652 may be coupled to one or more I/O device(s) 662. In some embodiments, computing system 652 may be in communication with database 108.

Processor 654 may retrieve and execute program code 668 (i.e., programming instructions) stored in memory 656, as well as stores and retrieves application data. Processor 654 is included to be representative of a single processor, multiple processors, a single processor having multiple processing cores, and the like. Network interface 660 may be any type of network communications enabling computing system 652 to communicate externally via computing network 605. For example, network interface 660 allows computing system 652 to communicate with computer system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include website 664, operating system 666, program code 668, machine learning module 670, time series service 672, and handler 674. Program code 668 may be accessed by processor 654 for processing (i.e., executing program instructions). Program code 668 may include, for example, executable instructions configured to perform steps discussed above in conjunction with FIGS. 2-3. As an example, processor 654 may access program code 668 to perform operations related to generating a directed advertisement by predicting an anticipated purchase window of a user. Website 664 may be accessed by computing system 602. For example, website 664 may include content accessed by computing system 602 via a web browser or application.

Machine learning module 670 may be configured to generate an anticipated window that predicts when a user will transact for a given merchant category code, third party merchant, and the like. For example, machine learning module 670 may be configured to learn how to generate the anticipated window for a user transaction. In some embodiments, machine learning module 670 may learn how to generate an anticipated window for when the user will transact at a third party merchant associated with a particular merchant category code. In some embodiments, machine learning module 670 may learn how to generate an anticipated window for when the user will transact with a particular third party merchant.

To train a prediction model for generating the anticipated window, machine learning module 670 may receive historical transaction data for a given user. Such historical transaction data may include, but is not limited to, a transaction amount for a given transaction, an entity associated with the transaction (e.g., third party merchant), a merchant category code associated with the transaction, a date of the transaction, and the like. Machine learning module 670 may use one or more of a decision tree learning model, association rule learning model, artificial neural network model, deep learning model, inductive logic programming model, support vector machine model, clustering mode, Bayesian network model, reinforcement learning model, representational learning model, similarity and metric learning model, rule based machine learning model, and the like to train the prediction model.

In some embodiments, rather than utilizing machine learning processes to generate the anticipated window, computing system 652 may utilize time series service 672. Time series service 672 may be configured to develop time series algorithms that track user spending. For example, time series service 672 may be configured to develop time series algorithms for the more popular merchant category codes and merchants, for which computing system 652 would track to improve (e.g., optimize) sales and spending. Time series service 672 may track when a particular customer (e.g., user) spends their money at their most common merchants and merchant category codes and input that information into a time series algorithm. In some embodiments, time series service 672 may take into consideration seasonality impact of spending. The time series algorithm generated by time series service 672 may include one or more variables. For example, time series algorithm may include a first variable corresponding to a trend of customer spending, a second variable corresponding to a seasonality of customer spending, and a third variable corresponding to a noise associated with customer spending. The output from the time series algorithm may be an anticipated purchase window with respect to, for example, a particular merchant or merchant category code. The anticipated purchase window may correspond to an anticipated date of next purchase. In some embodiments, the anticipated purchase window may further correspond to an anticipated purchase amount.

Handler 674 may be configured to maintain database 108. Database 108 may be in communication with computing system 652.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method of generating directed advertisements, comprising:
   identifying, by a computing system, a baseline history of customer spending for a plurality of merchant category codes;
   generating, by the computing system, a plurality of time series algorithms, the plurality of time series algorithms comprising a time series algorithm for each merchant category code of the plurality of merchant category codes, wherein the time series algorithm is based on the baseline history, the generating comprising:
      for a first merchant category code of the plurality of merchant category codes, generating a first time series algorithm by defining a first variable corresponding to a trend of the customer spending for the first merchant category code, a second variable corresponding to a seasonality of the customer spending for the first merchant category, code, and a third variable corresponding to a noise associated with the customer spending for the first merchant category code; and
      for a second merchant category code of the plurality of merchant category codes, generating a second time series algorithm by defining a fourth variable corresponding to a further trend of the customer spending for the second merchant category code, a fifth variable corresponding to a further seasonality of the customer spending for the second merchant category code, and a sixth variable corresponding to a further noise associated with the customer spending for the second merchant category code;
   receiving, by the computing system, a stream of transactions associated with a user;
   parsing, by the computing system, the stream of transactions into a plurality of sub-streams, wherein each of the plurality of sub-streams corresponds to transactions associated with a specific merchant category code;
   inputting, by the computing system, the stream of user data into the plurality of time series algorithms, the inputting comprising:
      determining that a first sub-stream of transactions correspond to the first merchant category code, based on the determining, inputting the first sub-stream of transactions into the first time series algorithm,
determining that a second sub-stream of transactions correspond to the second merchant category code; and
based on the determining, inputting the second sub-stream of transactions into the second time series algorithm;
receiving, by the computing system, as output from the first time series algorithm, a first anticipated purchase window for the user with respect to the first merchant category code, wherein the first anticipated purchase window comprises a first anticipated date of next purchase and first anticipated purchase amount for the first merchant category code;
receiving, by the computing system, as further output from the second time series algorithm, a second anticipated purchase window for the user with respect to the second merchant category code, wherein the second anticipated purchase window comprises a second anticipated data of next purchase and second anticipated purchase amount for the second merchant category code; and
directing, by the computing system, advertisements to the user in accordance with each of the first anticipated purchase window and the second anticipated purchase window.

2. The method of claim 1, wherein identifying, by the computing system, the baseline history of customer spending for the plurality of merchant category codes, comprises:
identifying the baseline history on a merchant-level.

3. The method of claim 1, wherein the stream of transactions associated with the user comprises at least one of merchant name, merchant category code, seasonality information, and amount spent.

4. The method of claim 1, wherein directing, by the computing system, the advertisements to the user comprises:
generating a personalized webpage comprising the advertisements.

5. The method of claim 1, wherein directing, by the computing system, the advertisements to the user comprises:
generating an electronic message comprising the advertisements; and
transmitting the electronic message to the user.

6. A system, comprising:
a processor; and
a memory having programming instructions stored thereon, which, when executed by the processor, perform one or more operations, comprising:
generating a plurality of time series algorithms, the plurality of time series algorithms comprising a time series algorithm for each merchant category code of a plurality of merchant category codes, wherein each time series algorithm is based on a baseline history of customer spending for a respective merchant code, the generating comprising:
for a first merchant category code of the plurality of merchant category codes, generating a first time series algorithm by defining a first variable corresponding to a trend of the customer spending for the first merchant category code, a second variable corresponding to a seasonality of the customer spending for the first merchant category code, and a third variable corresponding to a noise associated with the customer spending for the first merchant category code; and
for a second merchant category code of the plurality of merchant category codes, generating a second time series algorithm by defining a fourth variable corresponding to a further trend of the customer spending for the second merchant category code, a fifth variable corresponding to a further seasonality of the customer spending for the second merchant category code, and a sixth variable corresponding to a further noise associated with the customer spending for the second merchant category code;
receiving a stream of transactions associated with a user;
parsing the stream of transactions into a plurality of sub-streams, wherein each of the plurality of sub-streams corresponds to transactions associated with a specific merchant category code;
inputting the stream of user data into the plurality of time series algorithms, the inputting comprising:
determining that a first sub-stream of transactions correspond to the first merchant category code,
based on the determining, inputting the first sub-stream of transactions into the first time series algorithm,
further determining that a second sub-stream of transactions correspond to the second merchant category code, and
based on the further determining, inputting the second sub-stream of transactions into the second time series algorithm;
receiving as output from the first time series algorithm, a first anticipated purchase window for the user with respect to the first merchant category code, wherein the first anticipated purchase window comprises a first anticipated date of next purchase and a first anticipated purchase amount;
receiving, as further output from the second time series algorithm, a second anticipated purchase window for the user with respect to the second merchant category code, wherein the second anticipated purchase window comprises a second anticipated data of next purchase and second anticipated purchase amount for the second merchant category code; and
directing advertisements to the user in accordance with each of the first anticipated purchase window and the second anticipated purchase window.

7. The system of claim 6, wherein identifying the baseline history is on a merchant-level.

8. The system of claim 6, wherein the stream of transactions associated with the user comprises at least one of merchant name, merchant category code, seasonality information, and amount spent.

9. The system of claim 6, wherein directing the advertisements to the user comprises:
generating a personalized webpage comprising the advertisements.

10. The system of claim 6, wherein directing the advertisements to the user comprises:
generating an electronic message comprising the advertisements; and
transmitting the electronic message to the user.

* * * * *